US010687120B2

(12) United States Patent
Dubois et al.

(10) Patent No.: US 10,687,120 B2
(45) Date of Patent: Jun. 16, 2020

(54) MULTIMEDIA CONTENT SEARCH SYSTEM

(71) Applicant: TiVo Solutions Inc., San Jose, CA (US)

(72) Inventors: Marcel Dubois, San Jose, CA (US); Vin Chawla, San Jose, CA (US); Brian Beach, Columbus, IN (US); Glen Sanford, Alameda, CA (US); Robert F. Poniatowski, San Jose, CA (US); Shelly Glennon, San Jose, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

(21) Appl. No.: 15/927,429

(22) Filed: Mar. 21, 2018

(65) Prior Publication Data
US 2018/0213292 A1     Jul. 26, 2018

Related U.S. Application Data

(63) Continuation of application No. 15/069,939, filed on Mar. 14, 2016, now Pat. No. 9,955,226, which is a
(Continued)

(51) Int. Cl.
*H04N 21/482* (2011.01)
*G06F 16/955* (2019.01)
(Continued)

(52) U.S. Cl.
CPC ..... *H04N 21/4828* (2013.01); *G06F 16/3325* (2019.01); *G06F 16/7867* (2019.01);
(Continued)

(58) Field of Classification Search
CPC ............ H04N 21/4828; H04N 21/232; H04N 21/4825; H04N 21/4622; H04N 21/2665;
(Continued)

(56) References Cited

U.S. PATENT DOCUMENTS 6,005,565 A * 12/1999 Legall ............... G06F 17/30864
 348/E5.104
9,288,548 B1 * 3/2016 Dubois ............ G06F 17/30646
(Continued)

*Primary Examiner* — Junior O Mendoza
(74) *Attorney, Agent, or Firm* — Haley Guiliano LLP

(57) ABSTRACT

Techniques described herein enable a service to receive search requests from client systems and perform an integrated search across databases containing informational data for broadcast content and broadband content. The service receives the search request from the client device and formulates a query for at least one broadband database and at least one partner broadcast database. The service queries each broadband database with a compatible query that the service creates using information regarding the type of database queries each partner's database requires. Partners pay the service provider a fee for placing data in the database or for having their database searched by the service. The service formats the data received from the searches of the databases into a user interface screen that is presentable by the client device. The screen information instructs the client device on how it should respond to any key presses by the user.

18 Claims, 12 Drawing Sheets

Related U.S. Application Data continuation of application No. 12/121,672, filed on May 15, 2008, now Pat. No. 9,288,548.

(60) Provisional application No. 60/930,419, filed on May 15, 2007.

(51) Int. Cl.
| | |
|---|---|
| *G06F 16/332* | (2019.01) |
| *G06F 16/78* | (2019.01) |
| *G06F 16/9537* | (2019.01) |
| *H04N 21/433* | (2011.01) |
| *H04N 21/4788* | (2011.01) |
| *H04N 21/63* | (2011.01) |
| *H04N 21/858* | (2011.01) |
| *H04N 21/472* | (2011.01) |
| *H04N 21/242* | (2011.01) |
| *H04N 21/258* | (2011.01) |
| *H04N 21/2747* | (2011.01) |
| *H04N 21/41* | (2011.01) |
| *H04N 21/45* | (2011.01) |
| *H04N 21/6587* | (2011.01) |
| *H04N 21/232* | (2011.01) |
| *H04N 21/239* | (2011.01) |
| *H04N 21/2665* | (2011.01) |
| *H04N 21/462* | (2011.01) |

(52) U.S. Cl.
CPC ........ *G06F 16/955* (2019.01); *G06F 16/9537* (2019.01); *H04N 21/232* (2013.01); *H04N 21/2393* (2013.01); *H04N 21/242* (2013.01); *H04N 21/25891* (2013.01); *H04N 21/2665* (2013.01); *H04N 21/2747* (2013.01); *H04N 21/4135* (2013.01); *H04N 21/4334* (2013.01); *H04N 21/4532* (2013.01); *H04N 21/4622* (2013.01); *H04N 21/4788* (2013.01); *H04N 21/47214* (2013.01); *H04N 21/4825* (2013.01); *H04N 21/632* (2013.01); *H04N 21/6587* (2013.01); *H04N 21/8586* (2013.01); *Y10S 707/914* (2013.01); *Y10S 707/915* (2013.01); *Y10S 707/916* (2013.01)

(58) Field of Classification Search
CPC .......... H04N 21/2393; H04N 21/6587; H04N 21/4532; H04N 21/4135; H04N 21/2747; H04N 21/25891; H04N 21/242; H04N 21/47214; H04N 21/8586; H04N 21/632; H04N 21/4788; H04N 21/4334; G06F 16/9537; G06F 16/7867; G06F 16/3325; G06F 16/955; Y10S 707/916; Y10S 707/915; Y10S 707/914
See application file for complete search history.

(56) References Cited

U.S. PATENT DOCUMENTS

| | | | |
|---|---|---|---|
| 9,955,226 B2* | 4/2018 | Dubois | H04N 21/4828 |
| 2006/0026636 A1* | 2/2006 | Stark | H04N 5/44543 |
| | | | 725/37 |
| 2006/0250650 A1* | 11/2006 | Narahara | H04H 60/37 |
| | | | 358/1.18 |
| 2008/0066099 A1* | 3/2008 | Brodersen | G06F 17/30038 |
| | | | 725/35 |
| 2008/0163048 A1* | 7/2008 | Gossweiler, III | G06F 16/438 |
| | | | 715/277 |
| 2008/0249991 A1* | 10/2008 | Valz | G06F 17/30867 |

* cited by examiner

FIG. 4

Swivel Search 400

Search for any word or phrase in program titles or tags. Tags are keywords that are attached to the most popular programs. Swivel Search finds both broadcast programming and downloads.

```
HOW_            401
A  B  C  D  E   402
F  G  H  I  J
K  L  M  N  O
P  Q  R  S  T
U  V  W  X  Y
Z  CLR  SPC  DEL  123
```

403

How High (2001)
How I Met Your Mother
How It's Made
How, Jane
How Much to Remember On...
How Not to Decorate
How She Move (2007)
How Stella Got Her Groove B..

FIG. 5

Program 500

How I Met Your Mother

"Swarley" (2006) When the gang views a tape from Barney's ex-girlfriend, everyone must share their most embarrassing moment in order to get him to tell the full story about the tape. HDTV, CC, Repeat.

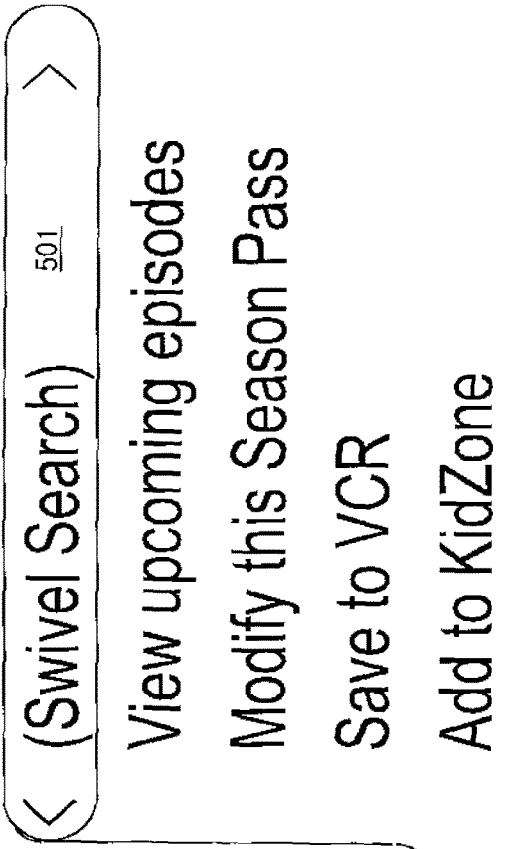

(Swivel Search) 501

View upcoming episodes
Modify this Season Pass
Save to VCR
Add to KidZone

Play
Keep until…
Delete now
If you like this…
More options

FIG. 6

How I Met Your Mother 600
Series

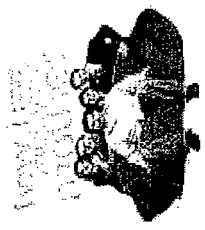

Comedy, Sitcom (2005 - Current)
Wednesday 8:00 pm ABC
TV-PG

601

*A love story in reverse. Egged on by his best friend's upcoming nuptials, Ted (Radnor) believes he finds the woman of his dreams in Robin (Smulders) -- though destiny might have something different in mind.*

Program Synopsis

Upcoming Showings   603
Available Downloads 604
If You Like This...
Starring:
  Neil Patrick Harris
  Jason Segel    602
  Josh Radner
  Cobie Smulders
  Alyson Hannigan
Guest Starring:

Episode Guide
Record this program

Press ⊙ to start a new search

FIG. 7
How I Met Your Mother
Series
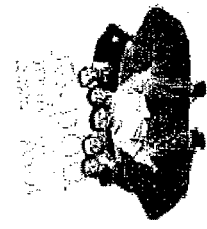
700
Program Synopsis
Upcoming Showings
Available Downloads
If You Like This....
Starring:
   Neil Patrick Harris
   Jason Segel
   Josh Radner
   Cobie Smulders
   Alyson Hannigan
Guest Starring:
There are 6 upcoming showings.
701
| | | | |
|---|---|---|---|
| Mon 12/18 | 8:00 pm | 5 | KPIX |
| Mon 12/18 | 8:00 pm | 5-1 | KPIXDT |
| Wed 12/20 | 8:30 pm | 5 | KPIX |
| Wed 12/20 | 8:30 pm | 5-1 | KPIXDT |
| Mon 12/25 | 8:00 pm | 5 | KPIX |
| Mon 12/25 | 8:00 pm | 5-1 | KPIXDT |
Press ⊙ to start a new search

FIG. 8

How I Met Your Mother Series 800

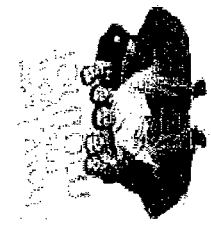

Program Synopsis

Upcoming Showings

Available Downloads

There are 24 available episodes.

801

802 🎬 Pilot
🎬 Purple Giraffe
🎬 Sweet Taste of Liberty
🎬 Return of the Shirt
🎬 Okay Awesome
The Slutty Pumpkin
Matchmaker If You Like This....

Starring:
 Neil Patrick Harris
 Jason Segel
 Josh Radner
 Cobie Smulders
 Alyson Hannigan Guest Starring:

Press 🔘 to start a new search

FIG. 9

How I Met Your Mother Series 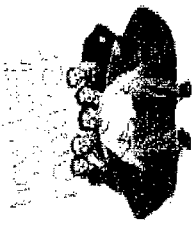
900

Comedy, Sitcom (2005 - Current)
Wednesday 8:00 pm ABC
TV-PG
901

A love story in reverse. Egged on by his best friend's upcoming nuptials, Ted (Radnor) believes he finds the woman of his dreams in Robin (Smulders) -- though destiny might have something different in mind.

Program Synopsis
Upcoming Showings
Available Downloads
If You Like This....
Starring:
  Neil Patrick Harris
  Jason Segel
  Josh Radner
  Cobie Smulders
  Alyson Hannigan
Guest Starring:

◄ Episode Guide ►
902
Record this program

Press ⊙ to start a new search

FIG. 10
How I Met Your Mother
Episode Guide
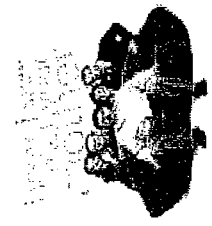
1000
Season 1
1001
Season 2
Season 3
Season 4
There are 24 episodes in Season 1.
1002
Pilot
Purple Giraffe
Sweet Taste of Liberty
Return of the Shirt
Okay Awesome
The Slutty Pumpkin
Matchmaker
Press ⓖ to start a new search FIG. 11
1100
Doogie Howser Series
There are 3 upcoming programs or available downloads tagged with this keyword.
Mitchell Anderson
Andrew Bilgore
Peter Riga  1102
Tags:  1101
Coming of Age  1103
Doctor
Medical
Prodigy  1104
E.R.
Grey's Anatomy
Scrubs
Press ⊙ to start a new search

MULTIMEDIA CONTENT SEARCH SYSTEM

CLAIM OF PRIORITY

This application is a continuation of U.S. patent application Ser. No. 15/069,939, filed Mar. 14, 2016, (allowed), which is a continuation of U.S. patent application Ser. No. 12/121,672, filed May 15, 2008, now U.S. Pat. No. 9,288,548, which claims benefit under 35 U.S.C. § 119(e) of U.S. Provisional Application No. 60/930,419, filed May 15, 2007 (expired). The entire contents of the above mentioned applications are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application. This application is related to U.S. patent application Ser. No. 12/121,619 entitled SWIVEL SEARCH SYSTEM, filed May 15, 2008, U.S. patent application Ser. No. 12/121,557 entitled MULTIMEDIA CONTENT SEARCH AND RECORDING SCHEDULING SYSTEM, filed May 15, 2008, now U.S. Pat. No. 8,301,648, and U.S. patent application Ser. No. 12/121,688 entitled MULTIMEDIA CONTENT SEARCH SYSTEM WITH SOURCE AND FIELD DIFFERENTIATION, filed May 15, 2008, now U.S. Pat. No. 8,914,394, each of which is owned by Applicant and is incorporated herein in its entirety by this reference thereto.

FIELD OF THE INVENTION

The present invention relates to digital video recorders ("DVRs").

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of the DVR to the consumer world has revolutionized the way viewers watch and record television programs. DVRs eliminate many of the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals (which may represent television programs and/or movies) as input from cables or satellite dishes, (or, in some cases, unlike VCRs, from broadband network connections) and also output television signals to a television set or other display.

A DVR's user can instruct the DVR to schedule, for recording, specified content that may be broadcasted or otherwise transmitted to the DVR at some future time. Thus, the user can schedule the automatic recording of the content in advance of the time that the DVR will receive the content. For example, the user can instruct the DVR to record unspecified content that will be broadcasted on a specified channel beginning at a specified date and time and ending at another specified time. For another example, the user can instruct the DVR to record a specified showing (on a specified channel, and beginning at a specified date and time) of a specified movie, specified event, or specified episode of a multi-episode television series. For another example, the user can instruct the DVR to record the next to-be-broadcasted instance of a specified movie, specified event, or specified episode of a multi-episode television series without specifying the date, time, or channel on which that instance will be broadcasted. For another example, the user can instruct the DVR to record all (or all first-run) episodes of a multi-episode television series on a specified channel without specifying the dates or times at which those episodes will be broadcasted. For another example, the user can instruct the DVR to record all (or all first-run) instances of movies, events, or episodes of a multi-episode television series that are associated with a specified keyword, a specified actor, and/or a specified director without specifying the titles, channels, or broadcasting times of those instances.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates an example of a user interface screen that allows a user to input search terms and dynamically displays a list of matches according to an embodiment of the invention;

FIG. 5 illustrates an example of a user interface screen that displays a program synopsis and user-selectable menu items according to an embodiment of the invention;

FIG. 6 illustrates an example of a user interface screen that displays a program synopsis and user-selectable search terms according to an embodiment of the invention;

FIG. 7 illustrates an example of a user interface screen that displays upcoming program listings and user-selectable search terms according to an embodiment of the invention;

FIG. 8 illustrates an example of a user interface screen that displays downloadable content listings and user-selectable search terms according to an embodiment of the invention;

FIG. 9 illustrates an example of a user interface screen that displays a program synopsis and a user-selectable episode guide according to an embodiment of the invention;

FIG. 10 illustrates an example of a user interface screen that displays an episode guide according to an embodiment of the invention;

FIG. 11 illustrates an example of a user interface screen that displays user-selectable tags according to an embodiment of the invention.

DETAILED DESCRIPTION

Figure 1:
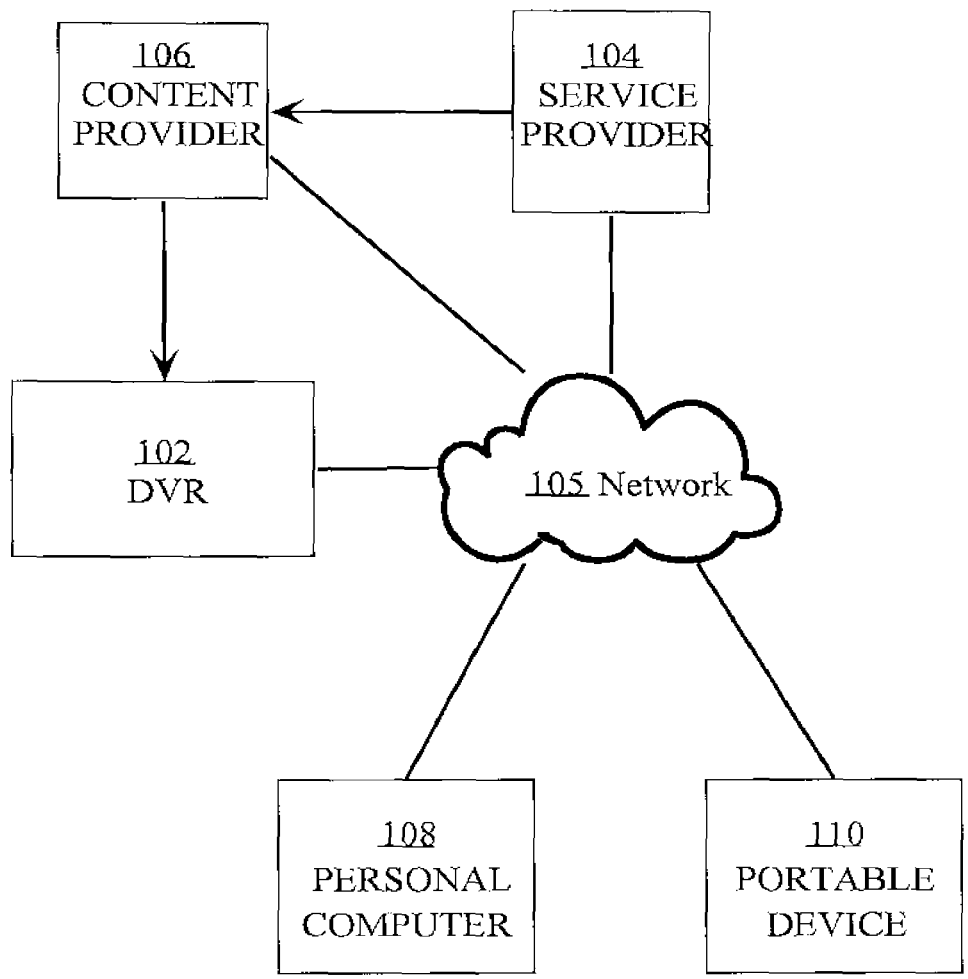
FIG. 1 is a block diagram illustrating a system for providing branded video tags according to an embodiment of the invention.

In the following description, for the purposes of explanation, numerous specific details are set forth in order to provide a thorough understanding of the present invention.

It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:
1.0 General Overview
2.0 System Structural Overview
3.0 Example Techniques and Processes
   3.1 Unified Searching of Broadband and Broadcast Multimedia Content
   3.2 Tagging Multimedia Content
   3.3 Filtering Broadband and Broadcast Multimedia Content Search Results
4.0 Implementation Mechanisms—Hardware Overview 1.0 General Overview Embodiments of the invention summarized above are described below in greater detail, along with some alternative embodiments of the invention. Although embodiments of the invention described below are described in the context of DVRs, in alternative embodiments of the invention, devices other than DVRs may be substituted for, and may perform similar operations to those that are performed by, DVRs.

In an embodiment, a service receives search requests from client systems and performs an integrated search across databases containing informational data for broadcast content and broadband content using the received search criteria. The service may be owned or operated by a service provider, third party, etc. Owners of client devices are charged a fee by the service provider, third party, etc., for access to the database search service, content recording scheduling, content download service, etc. A user enters search criteria on a client device. The client device can be a DVR, set-top box, cell phone, handheld device, laptop, PC, etc., for example.

The client device formulates a search request given the user's input and sends the search request to the service. The service receives the search request from the client device and formulates a query for at least one broadband database and at least one broadcast database. The broadband database contains data from partners of the service provider such as: Amazon.com, RocketBoom, dLife®, The New York Times®, and CNET®. Broadband databases may exist at each partner's server. The service queries each partner's database with a compatible query that the service creates using information regarding the type of database queries each partner's database requires. Data in the broadband database(s) consists of links to multimedia content that are available for download from the partners. The data also includes information describing the multimedia content such as: program description, program synopsis, program rating, actors, directors, producers, program title, pricing, etc., as well as search data tags.

In an embodiment, the partners pay the service provider a fee for placing data in the database and/or for having their database searched by the service. For example, partners may pay a fixed fee and/or a fee based on the number of times that the service queries the partner's database.

The broadcast database contains data from electronic program guide (EPG) providers such as Tribune Media Services®. The EPG data describes programs that are available from many different broadcasters and services such as: DirecTV®, Comcast®, CableVision®, etc. The EPG data contains information describing the program such as the channel that the program is available on, program description, program synopsis, program rating, actors, directors, producers, program title, broadcast date and time, etc., as well as search data tags.

The service performs searches on both databases using the search queries that it created. The databases can be databases that the service can directly access or database servers hosting the databases or other database services. The service receives or generates results from the search queries and organizes the retrieved information into a format that the client device can use. The service may also merge the search results from the broadband and broadcast databases to create a coherent, homogenous set of search results from disparate databases.

In an embodiment, the service also has access to its own client device database where the service stores information regarding the status of all the client devices in communication with the service. The client database includes, among other information, data describing the multimedia content that the client devices have recorded or downloaded. The service can include in the search results that concern broadband content, multimedia content that is available to download from other client devices. A client device can request downloads of multimedia content from multiple client devices and receive segments of the multimedia content from those client devices.

The client device receives the search results from the service. The client device processes the search results and displays the search results in a list to the user. The service creates the user interface screen for the client device to display. Each time a client device sends a search request to the service, the service formats the data received from the searches of the databases into a user interface screen that is presentable by the client device. The client device receives the user interface screen and displays the screen as formatted by the service. The screen information instructs the client device on how it should respond to any key presses by the user.

2.0 System Structural Overview

FIG. 1 illustrates an example system according to an embodiment. The system contains at least one client device such as DVR 102 which is communicatively coupled to network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider 104, content provider 106, personal computer 108 and portable device 110.

Personal computer 108 may be a personal computing device, such as a desktop computer or laptop computer, and is also coupled to network 105 through any communications interface, including wireless. Portable device 110 may be any handheld computing device, cellular phone, portable media player, or any other portable device capable of displaying multimedia content and is also coupled to network 105 through any communications interface, including wireless. DVR 102, personal computer 108, and portable device 110 each communicate with service provider 104 through network 105. In another embodiment, DVR 102, personal computer 108, and portable device 110 each communicate with content provider 110 through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment, content provider 106 provides broadcast program content to DVR 102 via cable, satellite, terrestrial communication, or other transmission method. Broadcast program content may include any multimedia content such as: audio, image, or video content. In another embodiment, content provider 106 provides multimedia content, such as any downloadable content, through network 105 to DVR 102, personal computer 108, or portable device 110.

In one embodiment, DVR 102 communicates with service provider 104, which provides program guide data, graphical resources (such as fonts, pictures, etc.), service information, software, advertisements, event identification data, and other forms of data that enable DVR 102 to operate independently of service provider 104 to satisfy user interests. In another embodiment, DVR 102, personal computer 108, and portable device 110 can communicate with each other to transfer content, metadata, or any other data through network 105, communication connection, or any local network.

In another embodiment, content provider 106 may provide, to service provider 104, content data or any metadata, including promotional data, icons, web data, and other information. Service provider 104 may then interpret the metadata and provide the content data and metadata to DVR 102, personal computer 108, or portable device 110.

Figure 2:
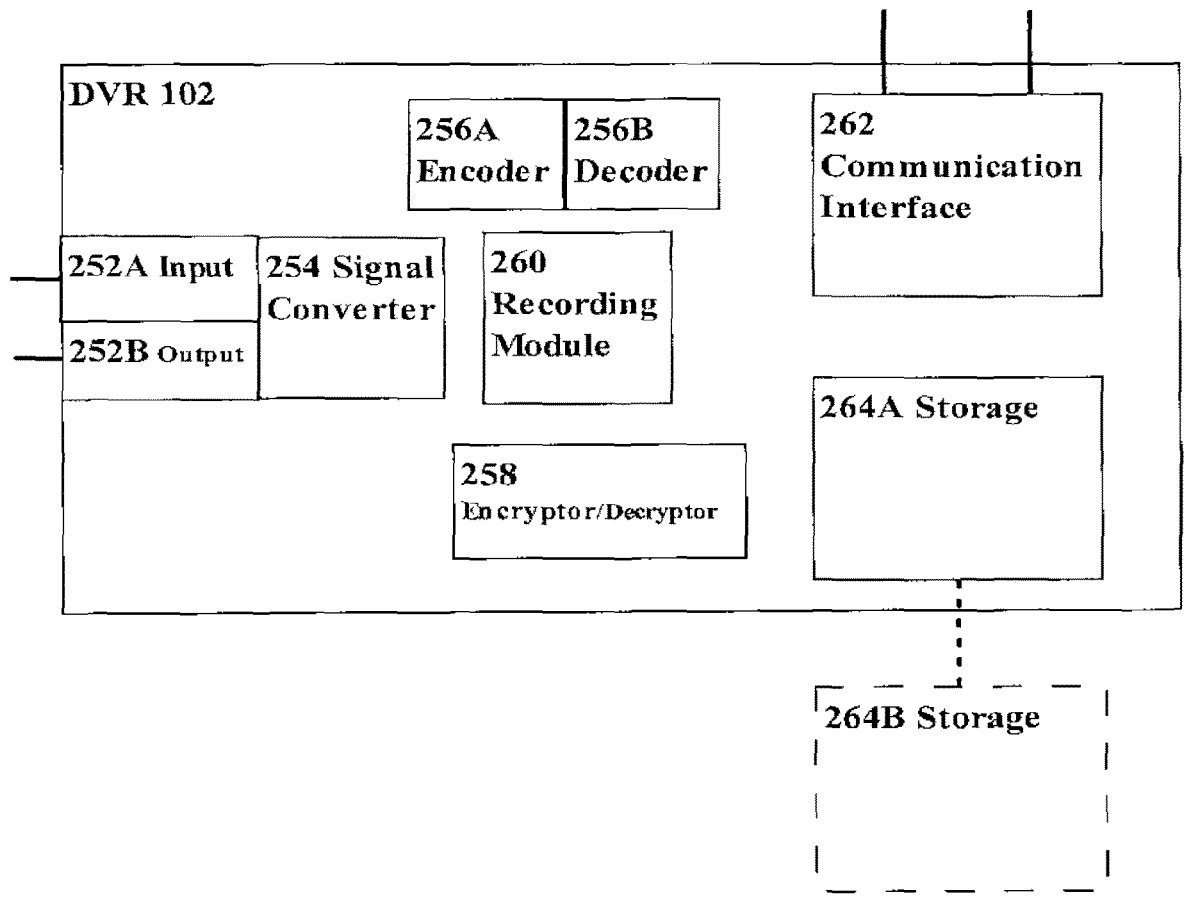
FIG. 2 is a block diagram illustrating a general overview of the components of a Digital Video Recorder (DVR) according to an embodiment of the invention.

Referring to FIG. 2, in an embodiment, DVR 102 generally comprises a plurality of components, signified by signal converter 254, that are necessary to digitize an analog television signal and convert it into a digital data stream or accept a digital data stream. An example of the internal structure and operation of a DVR is further described in U.S. Pat. No. 6,233,389.

DVR 102 receives broadcast signals from an antenna, from a cable TV system, satellite receiver, etc., via input 252A. Input 252A may comprise a plurality of tuning modules that allow a plurality of signals to be received and recorded simultaneously. For example, a TV input stream received by input 252A may take the form of a National Television Standards Committee (NTSC) compliant signal or a PAL compliant broadcast signal. For another example, a TV input stream received by input 252A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 252A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 252A and passed to the other modules as if the signals had been delivered via an MPEG-2 private data channel.

Recording module 260 records the incoming data stream by storing the digital data stream on at least one storage facility, signified by storage 264A/264B that is designed to retain segments of the digital data stream. Storage 264A/264B may be one or more non-volatile storage devices (e.g., hard disk, solid state drive, USB external hard drive, USB external memory stick, USB external solid state drive, network accessible storage device, etc.) that are internal 264A and/or external 264B. A signal converter 254 retrieves segments of the data stream, converts the data stream into an analog signal, and then modulates the signal onto a RF carrier, via output 252B, through which the signal is delivered to a standard TV set. Output 252B may alternatively deliver a digital signal to a TV set or video monitor. For example, DVR 102 may utilize a Digital Visual Interface port (DVI) for sending digital signals to a TV via a DVI cable.

DVR 102 also includes a communication interface 262, through which the DVR 102 communicates with network 105 via Ethernet, wireless network, modem, USB, or other communications standard. Further, DVR 102 may be integrated into a TV system such that the components described above are housed in a TV set capable of performing the functions of each component of DVR 102.

In another embodiment, DVR 102 generally comprises a plurality of components necessary to receive, record, store, transfer and playback digital data signals from a plurality of sources, such as a PC, a DVR, a service provider, or content server. DVR 102 can transfer digital data signals to another DVR or PC. DVR 102 may encode or decode digital signals via encoder 256A and decoder 256B into a plurality of formats for playback, storage or transfer. According to one embodiment of the invention, encoder 256A produces MPEG streams. According to another embodiment of the invention, encoder 256A produces streams that are encoded using a different codec. Decoder 256B decodes the streams encoded by encoder 256A or streams that are stored in the format in which the streams were received using an appropriate decoder. DVR 102 can also encrypt or decrypt digital data signals using encryptor/decryptor 258 for storage, transfer or playback of the digital data signals.

In one embodiment, DVR 102 communicates with service provider 104, which provides program guide data, graphical resources such as brand icons and pictures, service information, software programs, advertisements, and other forms of data that enable DVR 102 to operate independently of the service provider 104 to perform autonomous recording functions. Communication between DVR 102 and service provider 104 utilizes a secure distribution architecture to transfer data between the DVR 102 and the service provider 104 such that both the service data and the user's privacy are protected.

3.0 Example Techniques and Processes 3.1 Unified Searching of Broadband and Broadcast Multimedia Content According to one embodiment, an advanced DVR (e.g., DVR 102) allows a user to search for multimedia material across both broadcast and broadband sources. The user forms search criteria (by direct input or selecting a menu item) and instructs the DVR to perform the requested search.

The user typically does not have to be concerned about whether the search is for broadcast content or whether the search is for broadband content. The embodiment automatically performs a plurality of searches across dissimilar sources using the user's search criteria. Once the user is presented with a listing of available broadcast and broadband content that matches his search, the user can peruse the list of available content in order to obtain more information for particular content or to schedule recordings or downloads of particular content.

Figure 3:
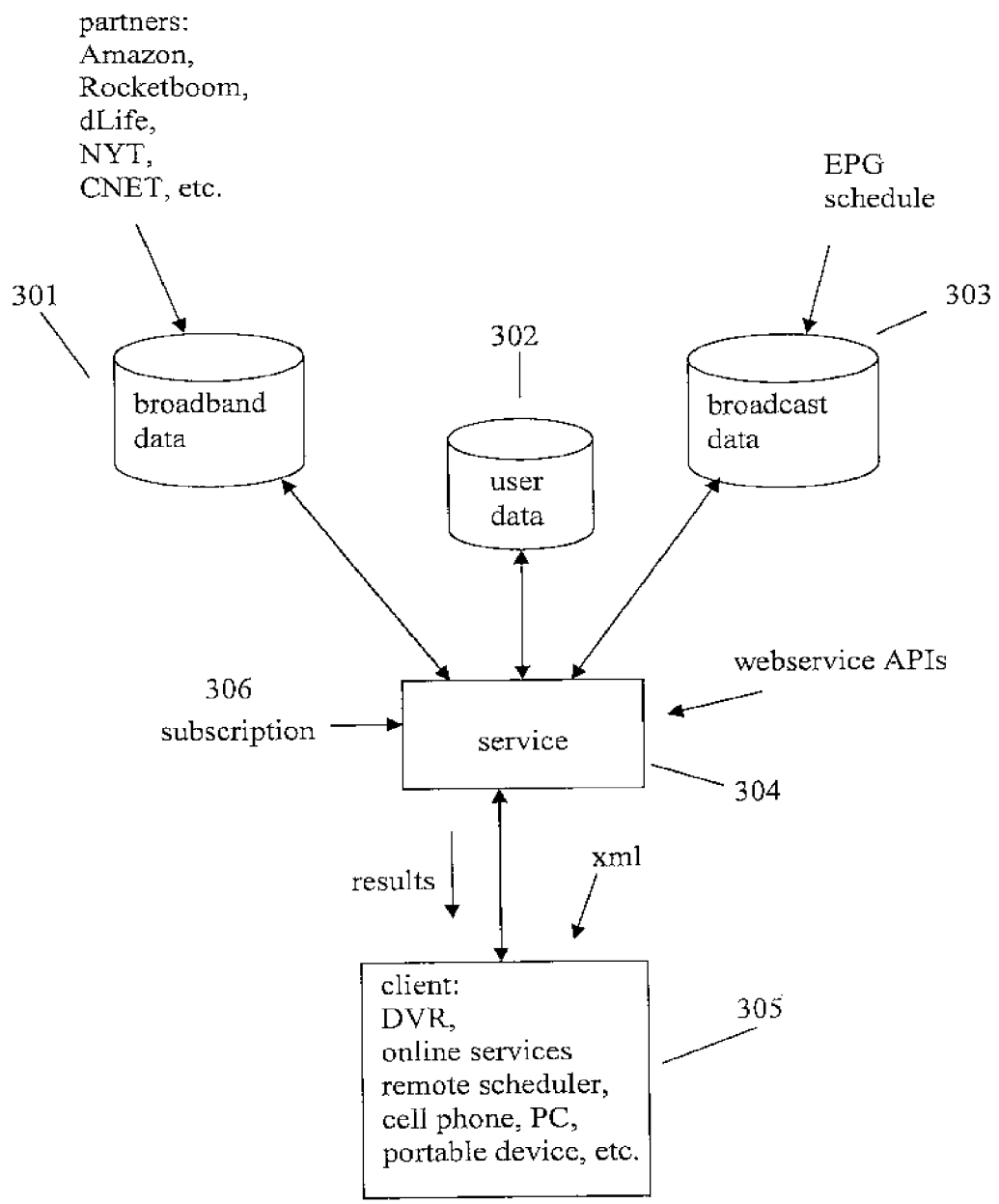
FIG. 3 is a block diagram illustrating an example of a service communicating with broadband and broadcast databases according to an embodiment of the invention.

FIG. 3 illustrates a service 304 that receives search requests from client systems and performs an integrated search across databases containing informational data for broadcast content and broadband content using the received search criteria. The service 304 can be a server implementing searches across databases 301 and 303. The service 304 can also consist of a plurality of Web Service Application Program Interfaces (APIs) that service client requests. The service 304 may be owned or operated by a service provider, third party, etc. Owners of client devices such as client device 305 are charged a fee by the service provider, third party, etc., for access to the database search service, content recording scheduling, content download service, etc. A user enters search criteria on a client device 305. The client device 305 can be a DVR, set-top box, cell phone, handheld device, laptop, PC, etc., for example.

The client device 305 formulates a search request given the user's input. FIG. 4 illustrates a screen shot of an entry screen 400 where the user enters information such as a keyword, actor name, director name, producer name, program title, etc. As the user enters each character on the virtual keypad 402 in the search, the client device 305 displays the entered characters in an entry field 401. The client device 305 formulates a search request using the entered characters. The client device 304 sends the search request to the service 304.

The service 304 receives the search request from the client device 305. The service 304 formulates a query for each database 301, 303. The databases consist of at least one broadband database 301 and at least one broadcast database 303. The broadband database 301 contains data from partners of the service provider such as: Amazon.com, RocketBoom, dLife®, The New York Times®, and CNET®. Broadband databases may exist at each partner's server. The service 304 then queries each partner's database with a compatible query that the service 304 creates using information regarding the type of database queries each partner's database requires. In an embodiment, the partners pay the service provider a fee for placing data in the database or for having their database searched by the service 304. For example, partners may pay a fixed fee and/or a fee based on the number of times that the service 304 queries the partner's database. The broadband database(s) makes it possible for the partners' products and services to be displayed to users. Data in the broadband database(s) consists of links to multimedia content that are available for download from the partners. The data also includes information describing the multimedia content such as: program description, program synopsis, program rating, actors, directors, producers, program title, pricing, etc., as well as search data tags (described below).

The broadcast database 303 contains data from electronic program guide (EPG) providers such as Tribune Media Services®. The EPG data describes programs that are available from many different broadcasters and services such as: DirecTV®, Comcast®, CableVision®, etc. The EPG data contains information describing the program such as the channel that the program is available on, program description, program synopsis, program rating, actors, directors, producers, program title, broadcast date and time, etc., as well as search data tags (described below). EPG data is typically updated periodically and typically covers 14 days of programming. The number of days is dependent upon the service provider. The EPG data covers, for example, the U.S., Mexico, Canada, and other countries. Given that the EPG data is on the service provider's database 303, the service provider can retain all the EPG data that EPG providers have delivered. This gives the service provider historical data from which a user can obtain historical data or program names. The service can provide a client device with information from the historical EPG data regarding multimedia content such as when the content was last broadcast. This type of information is typically not obtainable in normal DVRs or EPG services because EPG data is typically limited to a number of days, such as 14 days. Search requests for content that is not in a typical 14-day EPG would receive a null search response. In this embodiment, since the service has the historical EPG data, the search requests would receive a positive hit as long as the content has been shown in the time frame of the service's EPG data.

The service 304 performs searches on both databases 301, 303 using the search queries that it created. The databases 301, 303 can be databases that the service 304 can directly access or database servers hosting the databases or other database services. The service 304 receives or generates results from the search queries and organizes the search results into a format that the client device 305 can use. In an embodiment, the service 304 merges the search results from the broadband database 301 and the broadcast database 303 into a coherent, homogeneous set of search results that are usable by the service 304 and the client device 305. This may be needed because the databases 301, 303 may be disparate databases with differing search result formats.

In an embodiment, the service 304 also has access to its own client device database (not shown) where the service 304 stores information regarding the status of all the client devices in communication with the service 304. The client database includes, among other information, data describing the multimedia content that the client devices have recorded or downloaded. The service 304 can include in the search results that concern broadband content, multimedia content that is available to download from other client devices as described in U.S. patent application Ser. No. 11/285,411 which is owned by the Applicants and is hereby incorporated by reference. A client device can request downloads of multimedia content from multiple client devices and receive segments of the multimedia content from those client devices. This allows a user to obtain multimedia content that has not been broadcast for a long time period and is not scheduled to be broadcast as well as not being available from partners.

The client device 305 receives the search results from the service 304. The client device 305 processes the search results and displays the search results in a list 403 to the user. The list 403 begins with the first multimedia content that matches the characters in the entry field 401 that the user has entered. The list can be updated at each character entry or after a few seconds of inactivity from the user. The user may pause while entering characters to allow the list to be refreshed. The client device 305 creates the search request to the service 304 upon each character entry or few seconds of inactivity. This gives the user a dynamic list that reacts to the user's input in a rapid manner.

The user can also access the search mechanism through a program information screen that the user displays for a particular content that is on an EPG or has been recorded. FIG. 5 shows a screen 500 that is displayed for a recorded program. The screen 500 allows the user to navigate through menu options and select the search option 501.

When the user selects a multimedia content from the list 403 or the search option 501, the client device 305 displays a screen as in FIG. 6. The screen 600 displays information related to the selected multimedia content. Information contained in the data sent from the service 304 is used to display program information such as the program synopsis 601. The received data also may contain additional search terms 602 that allow the user to select more search terms that are related to the multimedia content. The data may also contain search request information regarding upcoming showings for the multimedia content 603 or available downloads for the multimedia content 604.

If the user selects upcoming showings for the multimedia content 603, the client device 305 sends a search request to the service 304 that requests information regarding upcoming showings for the multimedia content. The service 304 queries the broadcast database 303 for the upcoming showings for the multimedia content and sends the resulting data to the client device 305. FIG. 7 illustrates a screen 700 displaying upcoming broadcast showings for the multimedia content using data received from the service 304. The client device 305 receives EPG data relevant to channels the user receives, subscribes to, or the channels that are available in the area that the client device is in.

In one embodiment, the service 304 receives subscriber information 306 and looks up user data from a user data database 302 in order to supply the client device with the correct information regarding multimedia content that is available to the specific user via broadcast or broadband access. The service 304 can use the user's information to formulate search queries from the broadband database 301 and broadcast database 303 in order to find information that is appropriate for the user's location, age, preferences, etc. In one embodiment, the service 304 can filter content information based on the user's age or client device's parental control setting (described in further detail below).

If the user selects available downloads for the multimedia content 604, the client device 305 sends a search request to the service 304 that requests information regarding available downloads for the multimedia content. The service 304 queries the broadband database 301 for the available downloads for the multimedia content. As noted above, this operation could involve querying multiple partner databases. The service 304 sends the received query data to the client device 305. FIG. 8 illustrates a screen 800 displaying available downloads for the multimedia content. In this example, some of the available downloads are for episodes of a program series that are available from a partner. The screen 800 can display the list of available downloads 801 with the partner's logo 802 next to content titles available from that particular partner. The logo data can come from the broadband database 301 or the service 304. The user can select an episode from the list of available downloads 801 to download the content to his client device 305.

The download may originate from a partner and the user is presented with a screen that may display a synopsis of the episode and any costs associated with the download. The user may also select a download that is retrieved from other client devices as discussed above and as described in U.S. patent application Ser. No. 11/285,411. The service 304 filters one or more client devices according to a number of factors, including bandwidth, to create a pool of client devices for transferring the content. The service 304 initiates the transfer by either requesting each client device in the pool of client devices to begin transferring the content to the requesting client device 305, or by directly requesting the client device 305 to retrieve the content from the pool of client devices. The content is sent to the requesting client device in portions which are re-assembled at the client device 305 and stored for later playback. It is not necessary for the user to know where the download is originating from and the user may or may not be told what mechanism is being used to download the episode.

FIG. 9 illustrates a screen 900 displaying program information 901 for the multimedia content. The screen 900 also displays an option where the user can obtain more information about episodes (episode guide) of the multimedia content 902. If the user selects the episode guide 902, the client device 305 sends a search request to the service 304 that requests information regarding episode information for the multimedia content. The service 304 queries the broadcast database 303 and/or the broadband database 301 for the episode information for the multimedia content. The service 304 processes the received data and sends the processed data to the client device 305.

FIG. 10 illustrates a screen 1000 displaying available episodes for specific seasons for a particular series title. In an embodiment, each time the user selects a season further in the list 1001, the client device 305 sends a search request to the service 304 that requests information regarding episode information for the selected season for the multimedia content. The service 304 queries the broadcast database 303 and/or the broadband database 301 for the season episode information for the multimedia content. The service 304 processes the received data and sends the processed data to the client device 305. The client device 305 displays the list of episodes to the user 1002.

FIG. 11 illustrates a screen 1100 displaying tags that are associated with the multimedia content or series title. The user can perform a search by clicking on any of the tag keywords or phrases 1101. The client device 305 creates a search request using the selected tag. The service 304 performs a search of tag information contained in the broadband database 301 and/or the broadcast database 303 in the same manner as searches described above.

In an embodiment, the service 304 creates the user interface screen for the client device 305 to display. Each time a client device sends a search request to the service 304, the service formats the data received from the searches of the databases into a user interface screen that is presentable by the client device. The client device receives the user interface screen and displays the screen as formatted by the service 304. The screen information instructs the client device on how it should respond to any key presses by the user. For example, the user moves the highlight bar down and the client device checks which items on the screen are selectable and moves the highlight bar to the next selectable item on the screen. If the user selects an item, then the client device looks at the screen information to see if the selection operation merits the highlight bar moving to another location or requires that a search request be sent to the service 304. This allows the service to change the look and feel of user interface screens dynamically without having to update the client device's software to implement user interface changes. This approach is easily scalable and presents a highly maintainable model. Alternatively, the client device can format its own user interface screens when it receives screen information from the service 304.

3.2 Tagging Multimedia Content

Tags 1101 are also shown as an option that may be selected as shown in FIG. 11 on the left side of the screen. For the television series "Doogie Howser, M.D.", the tags "coming of age," "doctor," "medical," and "prodigy" are shown. When a tag is selected, content associated with that tag appears on the right side of the screen. In this example, for the tag "doctor", the television series "ER", "Grey's Anatomy" and "Scrubs" appear because they are associated with the tag and are scheduled to be shown in the near future.

Tags, as used herein, refer to a set of words, pictures or other media used to link various pieces of content together. Examples of tags may be, but are not limited to, locations in which the content is set, genres to which the content belongs, or the subject matter associated with the content. If the term "New York" is searched, results returned may include the television series "Friends", and the movies "Gangs of New York" and "Ghostbusters". The results are returned because each selection is set in the city of New York. In another example, the term "marriage" is searched. This search returns content that are associated with "marriage". Some results may include the television series "Wedding Story," certain episodes of television series in which marriage occurs such as "Friends," and the movie "The Runaway Bride".

Tags linked to content may include any association with words. Some examples of tags are "singing," "reality TV," "fashion," "terrorist," "crime," and "roommate." Tags may be added or changed over time. Tags are also not limited to words, but may consist of a picture associated with content (an example is the symbol that identifies singing star Prince), or other media such as sounds or music. For example, a selection of new age music may be associated with a show on spirituality and a selection of heavy metal music may be associated with a television show on skateboarding.

Tagging may be performed on either broadcast content or downloadable content. Broadcast content includes, but is not limited to, content from over-the-air antennas, satellite, and cable. Downloadable content includes, but is not limited to, broadband video, podcasts and other forms of audio, images, and RSS feeds.

In an embodiment, tags may be created by the service provider. For example, the service provider might wish to point out certain subject matter available on a television program. In this way, if a user repeatedly views a certain video segment that relates to a certain subject matter, then the service provides associations to other video segments that relate to the certain subject matter. The service provider may also provide tags that originate from the content provider.

In another embodiment, the content provider creates tags for the content provider's own programming. In this circumstance, the tags are not provided first to the service provider for dissemination for additional editorial. This allows the content provider to have the assurance that tags provided to users are accurate and reflect the intention of the content provider. The tags may then be used by the content provider to ensure that viewers may be linked to other shows that contain similar content or appeal to a similar demographic of viewers.

According to another embodiment, multimedia devices such as DVRs, PCs, cell phones, and handheld computing devices are used to create tags for video programs, herein referred to as "community tagging." Using a control interface such as a remote control, touch screen, touchpad, or a keyboard, when a user is viewing a video program, the user enters possible terms that associate the content to the tag. For example, the user might use the control interface to mark a program segment, or alternatively to mark an event within the video program. For instance, when viewing a sporting event such as a football game, the user signals via remote control when an exciting play occurs. The viewer may enter the term "exciting" and the tag is then associated with that program. Community tagging may be completely open or subject to the editorial of the service provider in order to maintain a sense of order. Also, community tagging may be aggregated so that only the most common actions are selected and then the tags may be disseminated to the network of users.

In an embodiment, data that may be selected is not limited to words used in credits and tags, but may include other media such as video, pictures, or sounds. Examples of pictures include, but are not limited to, headshots of actors, movie posters, or still frames from shows or movies. Sounds may include, but are not limited to, theme music from a show, music from a motion picture, or an actor's voice.

3.3 Filtering Broadband and Broadcast Multimedia Content Search Results

The service 304 has the ability to filter database query results according to user preferences, user personal information, client device settings, etc. As briefly discussed above, in an embodiment, the user can set preferences and personal information in his client device such as channels that he receives, channels that he views, age, sex, shows that the user likes and dislikes, the user's interests, credit card information, home address, etc.

When a client device 305 sends a search request to the service 304, the service 304 creates queries to the broadcast database 303 and/or the broadband database 301. Upon receipt of the requested data, the service 304 can filter the data to customize the data for the client device 305. In one embodiment, the service 304 can supply broadcast information to the client device 305 that only pertains to the channels that the client device receives. In another embodiment, the service 304 can supply the client device 305 with broadcast information that only pertains to the channels that the user watches.

This type of filtering can be performed on an opt-in/opt-out basis. If a user opts-in, the user has given the service permission to use the user's preferences and personal information 302, 306, to automatically filter requested broadcast and/or broadband information to match the user's preferences and personal information.

If the user opts-out, then the service can only use information that it knows about the client device 305 that does not involve the user's personal information. The service 304 is limited to the client device's locale and channels that a client device would receive in that area from the local cable or satellite broadcaster.

The service 304 can also filter information based on the type of client device. For example, if the client device 305 is a portable video device, then the service 304 may send a condensed version of the search results to the client device 305.

In an embodiment, the user can specify to the client device 305 that his selection of a search term is to be limited to a certain type of media or access. For example, the user can specify that the search be limited to HD content only. The user could also specify that the content listed be available from broadband only or broadcast only. The user can create any combination of such search limitations. Another embodiment would allow the user to specify combinations of tags that are displayed on a screen. Referring again to FIG. 11, for example, the user could specify combining the tags of Peter Riga 1102 and Prodigy 1104, or Prodigy 1104 and Coming of Age 1103, or any other combination of tags.

The user has the capability to select each tag using the highlight bar. Each time the user selects a tag, he can press a button on a remote control to signify that the selection is part of a combination. Once the user has selected all of his desired terms, he can press another button (or the same button) on the remote control that tells the client device 305 that the search is to be performed. As an example, the user selects Prodigy 1104 and Coming of Age 1103 and also selects HD content only. The client device 305 then formulates the search request and sends the request to the service 304. The service 304 creates queries across the databases that are appropriate for the search. Here, since the user has specified that the search be HD content only, the service 304 queries the broadband database 301, or partner servers as mentioned above, and the broadcast database 303 for HD content that includes tags or other content information that match the search tags that were selected, i.e., Prodigy and Coming of Age. The service 304 returns the query results to the client device 305. The client device 305 displays the search results to the user.

4.0 Hardware Overview

Figure 12:
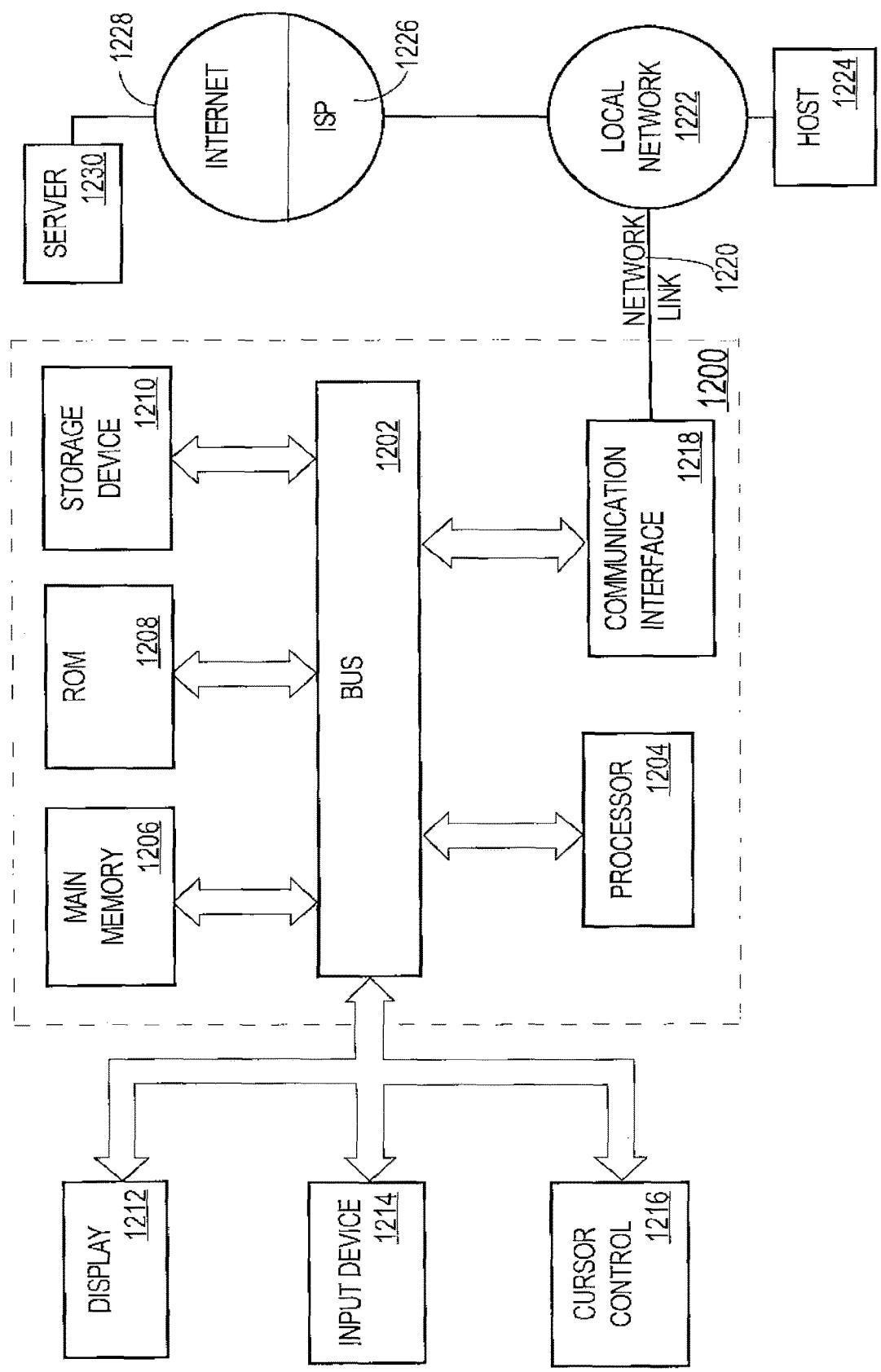
FIG. 12 is a block diagram of a system on which embodiments of the invention may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1200, various machine-readable media are involved, for example, in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, from a client device at a server, a user request to search for information about an identified program series of a video quality specified in the user request without the user request indicating whether the search is for broadcast content or broadband content;
   in response to receiving the user request to search for information about the identified program series:
   automatically selecting, by the server, at least one broadcast multimedia content information database and at least one broadband multimedia content information database;
   determining one or more channels watched via the client device; and
   sending, by the server, one or more search queries to the selected at least one broadcast multimedia content information database for broadcast information about the identified program series of the video quality specified in the user request and to the selected at least one broadband multimedia content information database for broadband information about the identified program series of the video quality specified in the user request;
   receiving, from the at least one broadcast multimedia content information database and the at least one broadband multimedia content information database, first and second search results indicating one or more upcoming broadcast showings of the identified program series and availability of one or more episodes of the identified program series from one or more broadband content sources respectively;
   filtering the first search results such that each search result of filtered first search results indicates the one or more upcoming broadcast showings of the identified program series via the one or more channels watched via the client device; and
   causing display, at the client device, of a graphical user interface including the filtered first search results and the second search results.

2. The method as recited in claim 1, wherein the at least one broadband multimedia content information database is hosted by at least one broadband content provider, the broadband content provider a partner of a service provider that owns or operates the server and a provider of content to subscribers of the service provider.

3. The method as recited in claim 1, wherein the at least one broadband multimedia content information database is hosted by at least one broadband content provider, the broadband content provider a partner of a service provider that owns or operates the server and a provider of content to subscribers of the service provider; and
   wherein a partner pays a fee to the service provider for the server to access the partner's broadband content information database.

4. The method as recited in claim 1, wherein causing display of the graphical user interface includes creating display information that contains user input response instructions for the client device.

5. The method as recited in claim 1, further comprising creating a compatible query for a particular broadband database using information regarding a type of database queries that the particular broadband database requires.

6. An apparatus comprising:
   a client device communicator, implemented at least partially in hardware, that receives, from a client device, a user request to search for information about an identified program series of a video quality specified in the user request without the user request indicating whether the search is for broadcast content or broadband content;
   a database communicator, implemented at least partially in hardware, that, in response to receiving the user request to search for information about the identified program series:
   automatically selects at least one broadcast multimedia content information database and at least one broadband multimedia content information database;
   determines, one or more channels watched via the client device; and
   sends one or more search queries to the selected at least one broadcast multimedia content information database for broadcast information about the identified program series of the video quality specified in the user request and to the selected at least one broadband multimedia content information database for broadband information about the identified program series of the video quality specified in the user request;
   wherein the database communicator receives, from the at least one broadcast multimedia content information database and the at least one broadband multimedia content information database, first and second search results indicating one or more upcoming broadcast showings of the identified program series and availability of one or more episodes of the identified program series from one or more broadband content sources respectively;

wherein the database communicator filters the first search results such that each search result of filtered first search results indicates the one or more upcoming broadcast showings of the identified program series via the one or more channels watched via the client device; and wherein the database communicator causes display, at the client device, of a graphical user interface including the filtered first search results and the second search results.

7. The apparatus as recited in claim 6, wherein the at least one broadband multimedia content information database is hosted by at least one broadband content provider, the broadband content provider a partner of a service provider that owns or operates the server and a provider of content to subscribers of the service provider.

8. The apparatus as recited in claim 6, wherein the at least one broadband multimedia content information database is hosted by at least one broadband content provider, the broadband content provider a partner of a service provider that owns or operates the server and a provider of content to subscribers of the service provider; and
   wherein a partner pays a fee to the service provider for the server to access the partner's broadband content information database.

9. The apparatus as recited in claim 6, wherein causing display of the graphical user interface includes creating display information that contains user input response instructions for the client device.

10. The apparatus as recited in claim 6, wherein the database communicator creates a compatible query for a particular broadband database using information regarding a type of database queries that the particular broadband database requires.

11. The apparatus as recited in claim 6, wherein the database communicator creates a compatible query for a particular broadcast database using information regarding a type of database queries that the particular broadcast requires.

12. One or more non-transitory computer-readable storage media storing instructions, which when executed by one or more processors cause performance of:
   receiving, from a client device at a server, a user request to search for information about an identified program series of a video quality specified in the user request without the user request indicating whether the search is for broadcast content or broadband content;
   in response to receiving the user request to search for information about the identified program series:
      automatically selecting, by the server, at least one broadcast multimedia content information database and at least one broadband multimedia content information database;
      determining one or more channels watched via the client device; and
      sending, by the server, one or more search queries to the selected at least one broadcast multimedia content information database for broadcast information about the identified program series of the video quality specified in the user request and to the selected at least one broadband multimedia content information database for broadband information about the identified program series of the video quality specified in the user request;
      receiving, from the at least one broadcast multimedia content information database and the at least one broadband multimedia content information database, first and second search results indicating one or more upcoming broadcast showings of the identified program series and availability of one or more episodes of the identified program series from one or more broadband content sources respectively;
      filtering the first search results such that each search result of filtered first search results indicates the one or more upcoming broadcast showings of the identified program series via the one or more channels watched via the client device; and
      causing display, at the client device, of a graphical user interface including the filtered first search results and the second search results.

13. The one or more non-transitory computer-readable storage media as recited in claim 12, wherein the at least one broadband multimedia content information database is hosted by at least one broadband content provider, the broadband content provider a partner of a service provider that owns or operates the server and a provider of content to subscribers of the service provider.

14. The one or more non-transitory computer-readable storage media as recited in claim 12, wherein the instructions cause performance of creating a compatible query for a particular broadband database using information regarding a type of database queries that the particular broadband database requires.

15. The one or more non-transitory computer-readable storage media as recited in claim 12, wherein causing display of the graphical user interface includes creating display information that contains user input response instructions for the client device.

16. The one or more non-transitory computer-readable storage media as recited in claim 12, wherein the at least one broadband multimedia content information database is hosted by at least one broadband content provider, the broadband content provider a partner of a service provider that owns or operates the server and a provider of content to subscribers of the service provider; and
   wherein a partner pays a fee to the service provider for the server to access the partner's broadband content information database.

17. A method comprising:
   receiving, from a client device, a query request for information about an identified program series of a video quality specified in the query request; and
   in response to receiving the query request for information about the identified program series:
      determining one or more channels watched via the client device;
      sending the query request to (1) a broadcast multimedia content information database for broadcast information about the identified program series of the video quality specified in the query request and and (2) a broadband multimedia content information database for broadband information about the identified program series of the video quality specified in the query request;
      receiving, from broadcast multimedia content information database and the broadband multimedia content information database, first and second query results indicating one or more upcoming broadcast showings of the identified program series and availability of one or more episodes of the identified program series from one or more broadband content sources respectively;

filtering the first query results such that each query result of filtered first query results indicates the one or more upcoming broadcast showings of the identified program series via the one or more channels watched via the client device; and sending, to the client device, the filtered first query results and the second query results for generating display of a user interface comprising the filtered first query results and the second query results.

18. A method comprising:

receiving, from a client device, a query request for information about an identified program of a video quality specified in the query request; and in response to receiving the query request for information about the identified program:

determining one or more channels watched via the client device;

sending the query request to (1) a broadcast multimedia content information database for broadcast information about the identified program of the video quality specified in the query request and (2) a broadband multimedia content information database for broadband information about the identified program of the video quality specified in the query request;

receiving, from broadcast multimedia content information database and the broadband multimedia content information database, first and second query results indicating one or more upcoming broadcast showings of the identified program and availability of one or more episodes of the identified program from one or more broadband content sources respectively;

filtering the first query results such that each query result of filtered first query results indicates the one or more upcoming broadcast showings of the identified program series via the one or more channels watched via the client device; and sending, to the client device, the filtered first query results and the second query results for generating display of a user interface comprising the filtered first query results and the second query results.

* * * * *